United States Patent
Stecher

(10) Patent No.: US 8,119,577 B2
(45) Date of Patent: Feb. 21, 2012

(54) OBJECT COMPRISING A FRICTION-REDUCING COATING, AND METHOD FOR THE PRODUCTION OF A COATING

(75) Inventor: Christoph Stecher, Wilhelmshaven (DE)

(73) Assignee: ACS Coating Systems GmbH, Wilhelmshaven (DE)

( * ) Notice: Subject to any disclaimer, the term of this patent is extended or adjusted under 35 U.S.C. 154(b) by 978 days.

(21) Appl. No.: 11/817,546

(22) PCT Filed: Mar. 2, 2006

(86) PCT No.: PCT/DE2006/000371
§ 371 (c)(1),
(2), (4) Date: Apr. 18, 2008

(87) PCT Pub. No.: WO2006/092126
PCT Pub. Date: Sep. 8, 2006

(65) Prior Publication Data
US 2008/0247687 A1    Oct. 9, 2008

(30) Foreign Application Priority Data
Mar. 2, 2005  (DE) .................... 10 2005 009 552

(51) Int. Cl.
*C10M 107/20* (2006.01)
*C10M 125/02* (2006.01)
*C10M 125/22* (2006.01)
*B05D 3/02* (2006.01)
(52) U.S. Cl. ........ 508/100; 508/105; 508/108; 508/110; 427/385.5

(58) Field of Classification Search ........... 508/110, 508/100, 105, 108; 427/385.5
See application file for complete search history.

(56) References Cited

U.S. PATENT DOCUMENTS

| | | | |
|---|---|---|---|
| 4,562,226 A * | 12/1985 | Coombes et al. | 524/767 |
| 5,041,335 A * | 8/1991 | Inai et al. | 428/416 |
| 5,376,996 A | 12/1994 | Sankaran | |
| 5,686,176 A | 11/1997 | Adam | |
| 5,836,589 A | 11/1998 | Sakata | |
| 5,852,139 A | 12/1998 | Scheckenbach | |
| 6,068,931 A | 5/2000 | Adam et al. | |
| 6,106,936 A | 8/2000 | Adam | |
| 6,203,207 B1 | 3/2001 | Yamamoto et al. | |
| 6,279,916 B1 * | 8/2001 | Stecher | 277/592 |
| 6,382,454 B1 * | 5/2002 | Buffard et al. | 220/573.1 |

(Continued)

FOREIGN PATENT DOCUMENTS

DE    42 00 385    7/1993

(Continued)

OTHER PUBLICATIONS

English translation of International Preliminary Report for PCT/DE2006/000371.

*Primary Examiner* — Jim Goloboy
(74) *Attorney, Agent, or Firm* — Fish & Richardson P.C.

(57) ABSTRACT

An object has bearing location where the object comes into contact with a counter-piece. The bearing location includes a coating to reduce wear and friction. The coating comprises about 90-100 weight percent thermoplastic polymer and about 0-10 weight percent finely divided solid fillers and finely divided dry lubricants. The coating has a thickness of between about 5-50 μm.

26 Claims, 2 Drawing Sheets

U.S. PATENT DOCUMENTS

| | | |
|---|---|---|
| 7,144,622 B1 * | 12/2006 | Stecher et al. ............... 428/217 |
| 2005/0025977 A1 | 2/2005 | Adam et al. |
| 2005/0181194 A1 | 8/2005 | Haupert et al. |

FOREIGN PATENT DOCUMENTS

| | | |
|---|---|---|
| DE | 44 30 474 | 3/1996 |
| DE | 195 06 684 | 9/1996 |
| DE | 196 13 979 | 10/1997 |
| DE | 197 34 480 | 3/1998 |
| DE | 295 22 175 | 6/2000 |
| DE | 199 41 410 | 3/2001 |
| DE | 101 47 292 | 5/2003 |
| DE | 102 26 266 | 12/2003 |
| EP | 0 343 282 | 11/1989 |

* cited by examiner

Key:
1. Prepare the powder mixture
2. Prepare the solvent
3. Produce the dispersion
4. Coat the object
5. Remove the solvent

OBJECT COMPRISING A FRICTION-REDUCING COATING, AND METHOD FOR THE PRODUCTION OF A COATING

TECHNICAL FIELD

This patent application relates to an object with a bearing location where the object comes into frictional contact with a counter-part or a counter-piece. Such an object can be a sliding bearing or a friction bearing on which different components of one or more devices, in particular the movable components of a machine or another mechanical device, move against one another under pressure.

BACKGROUND

The surfaces of the object and the corresponding counter-piece that rub against one another at the bearing location can be made of a metal, a ceramic material, or any other desired solid material. If these materials rub directly against one another, the bearing location can heat up as a consequence of friction. As a result, deformation of the bearing location and increased wear can arise. Even the undisturbed movement of the object and the counter-piece against one another can be impeded as a result of friction and, as a consequence, thermal expansion.

Objects with bearing locations usually have either a separate sliding bearing or a friction bearing or they are to be provided with a friction-reducing coating at the critical location. It is known, for example, that such solid sliding bearings or friction bearings can be manufactured from Teflon, a silicone, PEEK, PA, PI, PA/PI or a natural or synthetic hard rubber. It is also known that a friction-reducing coating of Teflon, polyimide and/or polyamide can be applied to objects that rub against one another and press against one another under slight pressure. Coatings of a sintered metal are also known for this purpose.

For objects with a friction-bearing location, although friction at the bearing surface is reduced relative to a bearing location without a coating, wear is still too great, especially that of the friction-reducing insert or the friction-reducing layer. Additionally, the known friction-reducing coatings and inserts have a limited stability with respect to temperature and a limited mechanical strength. Such extensive wear leads to a reduced service life or it requires frequent changing of the friction-reducing inserts or coatings.

For example, metallic, slippage-promoting coatings are known for high loads in terms of pressure and speed but exhibit poor dry-running properties.

Synthetic materials in the form of slippage-promoting lacquers or fully synthetic solid bearings, which have good dry-running properties, are known for low loads, but are unsuitable for high loads.

SUMMARY

Described herein is an object with a sliding or friction bearing location which is improved in regard to friction and/or wear and capable of being used in a versatile manner.

It has been found in this application that friction and/or wear at the bearing location can be reduced with a thin layer of a coating, which essentially comprises a high-performance thermoplastic. This thermoplastic polymer can be selected from the family comprising the polyaryletherketones (PAEK), such as polyetheretherketone (PEEK), polyetherketone (PEK), polyetherketoneetherketone (PEKEK) and mixtures thereof. The polymer can also comprise a liquid crystalline polymer (LCP). Use can also be made of PPS with slight restrictions to achieve very good results. PEEK and PEK are especially preferred, along with mixtures that comprise PEEK and PEK. These polymers are characterized by having higher mechanical strength with simultaneously high stability with respect to temperature. Surprisingly, it has been found that friction at such a coating can be reduced with these polymers.

Coatings made exclusively of the thermoplastic polymer show very good wear properties as well. Homogeneous and mechanically highly stressable coatings obtained have significantly lower wear with simultaneously lower friction compared to known coatings that comprise PI, PAI or PDFE.

The coating can have a layer thickness ranging from 5 μm up to e.g. 50 μm, advantageously from 5-30 μm and, sufficient for the majority of applications, 10-20 μm. It is found that layers starting from approximately 3 μm can be manufactured homogeneously with desired strength and the lubricity and wear properties can reach an optimum starting from even 5 μm.

An additional advantage of the coating with a small layer thickness is that the dissipation of heat from such thin coatings into the supporting material, which is e.g. metallic and is located under the coating, is improved at the bearing location. This is particularly interesting for applications in which large frictional forces and consequently large amounts of frictional heat are produced. These can be dissipated more rapidly before overheating sets in, which can lead to melting of the coating or, in general, to damage or to the destruction. Thus the stability of the coating or of the object with such a coating is improved relative to known coatings.

It has also been found that the disadvantageous effects of thermoplastics that arise when the glass transition temperature is exceeded, such as, in particular, reduced mechanical strength, cannot be observed when the thin coating in this application is heated above the glass transition temperature of the thermoplastic. This could be due to a strain effect on the thin coating along with the surface that is located beneath it, which acts positively on the material properties of the thin layer and prevents the glass transition process or at least the negative consequences on the layer properties. This effect may be further amplified as a result of the good adhesion properties of the coating to suitable substrates.

In addition to the thermoplastic polymers, the coating can also contain finely divided solid fillers in a total proportion of up to 10 wt %, and up to maximally 5 wt %. The fillers are selected in such a way that, on the one hand, they do not reduce the stability of the coating with respect to temperature and, on the other hand, do not increase friction but still have great mechanical strength.

Suitable fillers can be (nano-) ceramic particles, metallic particles, or silica. Quartz or diamond may also be very suitable. Surprisingly, it has been found that these fillers have practically no effect in terms of increasing the friction of the coating but are capable of further increasing the hardness and wear resistance of the coating.

Finely divided metallic particles, from e.g. aluminum, bronze, copper, tin, chromium, nickel, antimony, titanium, zirconium, manganese, cobalt, zinc and the oxides thereof, or iron oxide, can also be contained in the coating.

It is generally true that the particulate fillers may be rounded rather than being sharp-edged or angular. It is also advantageous if the particle size of the fillers is approximately an order of magnitude below the desired layer thickness of the coating. It is also advantageous if the particles are present in only a narrowly regulated size distribution so that a particle size, which is based on e.g. the $d_{50}$ value, varies in size over a narrow range. Fibers of the small size required for thin layers are no longer available and are unsuitable as fillers for the coating.

The high-performance thermoplastic may be present at a level of purity of at least 95 wt % and, in particular, at more than 97 wt %, so that maximally 5 wt % of the polymer matrix comprises other polymers, which may be also hard and stable with respect to high temperatures. The fluorine polymers, which are usually contained in known slippage-promoting layers, such as PTFE, do not result in any advantages for the slippage-promoting layer in this application, so the slippage-promoting layer is free from fluorine polymers.

Additionally or alternatively to the filler, a friction-reducing coating can also contain a dry lubricant in a proportion of e.g., maximally 10 wt %, wherein the proportion of the fillers and/or the dry lubricant contained in the polymer matrix advantageously do not exceed the aforementioned 10 wt % individually nor in terms of their sum. Such a dry lubricant can be compounds that have a layer structure, such as graphite and molybdenum sulfide.

For one embodiment, the thermoplastic high performance polymer is present in a proportion of at least 60 wt %. A proportion of up to 20 wt % of molybdenum sulfide and, in addition, up to 20 wt % of graphite may be suitable as a filler or dry lubricant in the coating.

For example, an advantageous friction-reducing coating of an object comprises the following components:

A) 90-100 wt % of a thermoplastic polymer that may be PEEK, PEK, LCP, PPS and mixtures comprising PEEK and PEK;

B) 0-10 wt % of a finely divided filler and/or;

C) 0-10 wt % of a dry lubricant.

An advantageous friction-reducing and/or wear-reducing coating for an object with a bearing location can also be obtained with a coating that has a multilayer structure. In particular, the multilayer structure can comprise an adhesion-promoting layer as the lowermost layer, in which 30-90 wt % of finely divided metallic particles are present in addition to the designated high-performance thermoplastic polymer. With such metal-containing adhesion-promoting layers, a stable multilayer structure of the entire coating arises as a result of the thermoplastic component that is common to all the sublayers, this multilayer structure also having significantly improved adhesion to metallic surfaces in particular. It is also advantageous if such an adhesion-promoting layer does not worsen the mechanical properties of the coating. In regard to the metallic particles in the adhesion-promoting layer, the choice of metal is subject to significantly fewer limitations since these particles do not have to contribute to the reduction in friction of the entire coating. Thus iron-containing particles, for example, or those comprising a light metal or a nonferrous metal may be very suitable.

Objects with a friction-reducing and/or a wear-reducing coating have a coating thickness that has been adapted to the desired type of use in terms of bearing force, ambient temperature, chemical environment and relative speed of the surfaces that slide over or rub against one another. For example, a coating that has been designed for chemical requirements that are not too demanding can even be realized with a layer thickness of up to about 10 µm.

The coating can be applied, with good adhesion, to surfaces that comprise metal, a ceramic material and synthetic materials as well, provided that the material endures the high temperatures of the layer production process, which are engendered by the manufacturing process.

If the metal or ceramic surface under the coating has a suitable roughness, it can increase the mechanical strength of the coating and the proportion of filler materials can also be further reduced by these materials serving merely to increase the strength.

Two processes are available in principle for applying the coating that reduces friction or wear. It is possible, for example, to apply the coating in the dry state in the form of a powder coating, and then to convert the initially applied powder layer into a homogeneous coating in a second thermal step. The powder coating can be assisted electrostatically by providing the powder to be applied with an electric charge while the object to be coated, in contrast, is electrically grounded or connected to an opposing polarity. It is also possible to carry out the coating on a pre-heated surface of the object, to which the particles may be able to adhere as a result of the melting in of the components.

The powder particles can be sprayed on, sprinkled on or applied in some other way. Compaction of the layer then takes place. In order to do this, the object together with the applied powder layer can be brought in an oven to a certain temperature at least above the melting point of the polymers contained in the powder layer. For this purpose, it is advantageous to subject the object with the powder layer to a temperature program that provides defined holding times at defined temperatures and, accordingly, includes suitable cooling down. It is also possible to carry out the temperature treatment in a tunnel oven with zones that may be thermostatically controlled to different levels, through which the object may be led with appropriate dwell times.

Another particularly advantageous possibility for the manufacture of a coating is to apply to the object a dispersion that contains all the components of the coating in finely divided and dispersed form in a solvent or a solvent mixture, e.g. aqueous or with water and/or alcohols, and then dry the coating and subsequently subject it to a thermal treatment, as in the case of the powder coating.

The dispersion can be applied by immersion, brushing, spraying, or in other ways. In order to achieve greater layer thicknesses, it can be advantageous to carry out the coating in several sequential steps. After each step one can, for example, evaporate the solvent from the applied dispersion layer. It is also possible to carry out a temperature treatment after each individual step in order to melt, or at least to pre-compact, the dispersion layer. The number of coating steps to be carried out may be determined by the desired layer thickness and depends on the particle size of the solids (thermoplastic and filler) contained in the dispersion and on the application process that has been selected.

DETAILED DESCRIPTION

The substrate to be coated SU represents the object to be coated, or a region thereof. The surface to be coated can initially be subjected to a chemical and/or mechanical activation treatment. For this, mechanical roughening can be used, e.g. by a sandblasting blower, or via etching with acids or alkalis, or via a plasma treatment. An appropriately pretreated surface has additional chemical/physical bonding sites and it is clean and free from grease and, if roughened, has a larger surface area which leads to better adhesion of the coating to be applied. An advantageous feature may be a degree of roughness of up to 20 μm (RZ value or height), wherein the roughness-engendered height differences on the surfaces to be coated should amount to maximally approximately 50% of the desired layer thickness of the coating. The layer thickness of the finished coating to be selected may be determined by the mean level of the peaks and valleys formed by roughening.

Optimum roughening can also be effected by an appropriately rough intermediate layer that can be manufactured in a simple manner with the desired surface roughness. Sintered ceramic layers or sintered bronzes may be suitable for this purpose.

Figure 1:
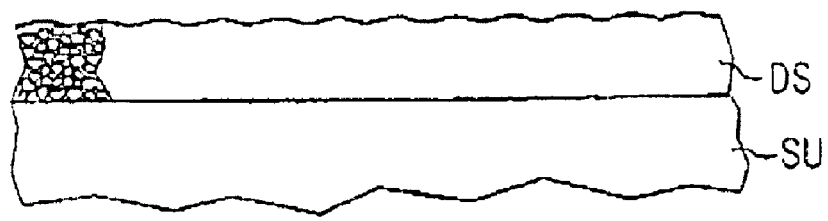
FIG. 1 shows a schematic cross section of an object with an applied dispersion layer.

A dispersion layer DS is then applied to this surface, the dispersion containing all the coating components, which may be dispersed in finely divided form in a solvent or mixture of solvents, and have a particle size distribution that is as homogeneous as possible. An application process is selected that may be suitable for the manufacture of the desired layer thickness. FIG. 1 shows a substrate SU coated in this way with an applied dispersion layer DS.

Figure 2:
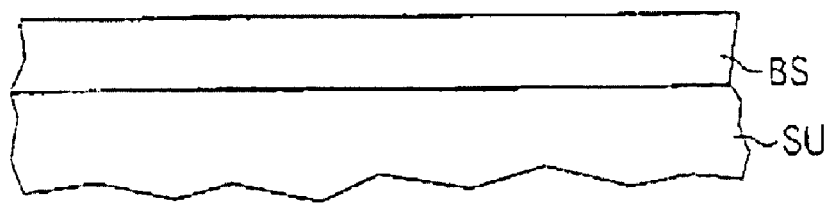
FIG. 2 shows an object with a coating.

After carrying out a temperature program—during which the substrate or the object to be provided with the dispersion layer DS is heated to a temperature above the melting point of the thermoplastic contained in the dispersion—a homogeneous coating BS may be obtained that is free of pores and compact and has good mechanical cohesion along with good adhesion to the substrate SU. FIG. 2 shows the finished object.

It is possible to carry out the coating on only one subregion of the surface. The remaining region that is not to be coated can be shielded, or an application process for the dispersion may be selected that is capable of differentiating between different surface regions, e.g. brushing or printing. This covering procedure can also take place with a shadow mask during the spraying on of the dispersion. This shadow mask can also be constructed in the form of a film that is applied to the surface of the substrate SU and that leaves uncovered the regions of the surface that are to be coated. After the application of the dispersion layer DS, the film can be removed and pulled off, for instance, whereby the regions of the dispersion layer DS that have been applied over it are pulled off at the same time.

Figure 3A:
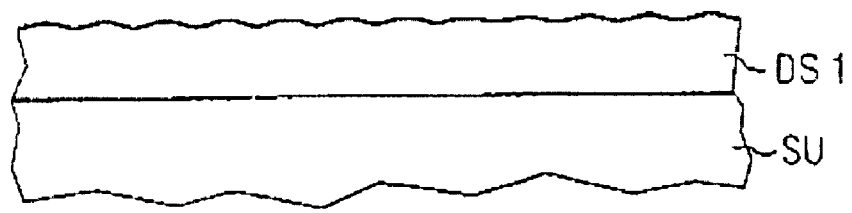
FIG. 3 shows a process sequence for a coating using different process steps.
Figure 3B:
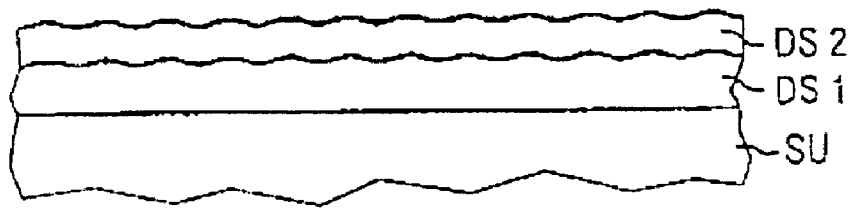
Figure 3C:

FIG. 3 shows one embodiment of the process with which a greater layer thickness can be achieved despite the smaller particle diameter that has been selected for the solids contained in the dispersion. In order to do this, at least the solvent is removed—as an alternative, the first dispersion layer is additionally pre-compacted to an appropriate extent by a temperature treatment—following the application of the first dispersion layer DS1 as illustrated in FIG. 3a. In a second step, the dispersion coating is repeated, and a second dispersion layer DS2 is applied. If required, this layer can also be pre-compacted and the coating step can be repeated once again. In a final step, as illustrated in FIG. 3c, the structure, which includes dispersion layers and several sub-layers, is finally brought to a temperature above the melting point of the thermoplastic, whereby one obtains a fully compacted, pore-free sealed coating BS on the substrate SU.

For example, a composition which may be suitable for application by dispersion processes and may be also friction-reducing, contains solids in the following proportions by weight:

97 wt % PEEK;
1 wt % nano-particulate $Al_2O_3$;
1 wt % MoS powder; and
1 wt % graphite powder.

The solids may be optionally dispersed with auxiliary agents in a solvent, which may be water or, advantageously, may be miscible with water, or mixed with water, e.g. alcohol and isopropanol. The dispersion mixture then contains approximately 30 wt % of the aforementioned solids.

Figure 4:
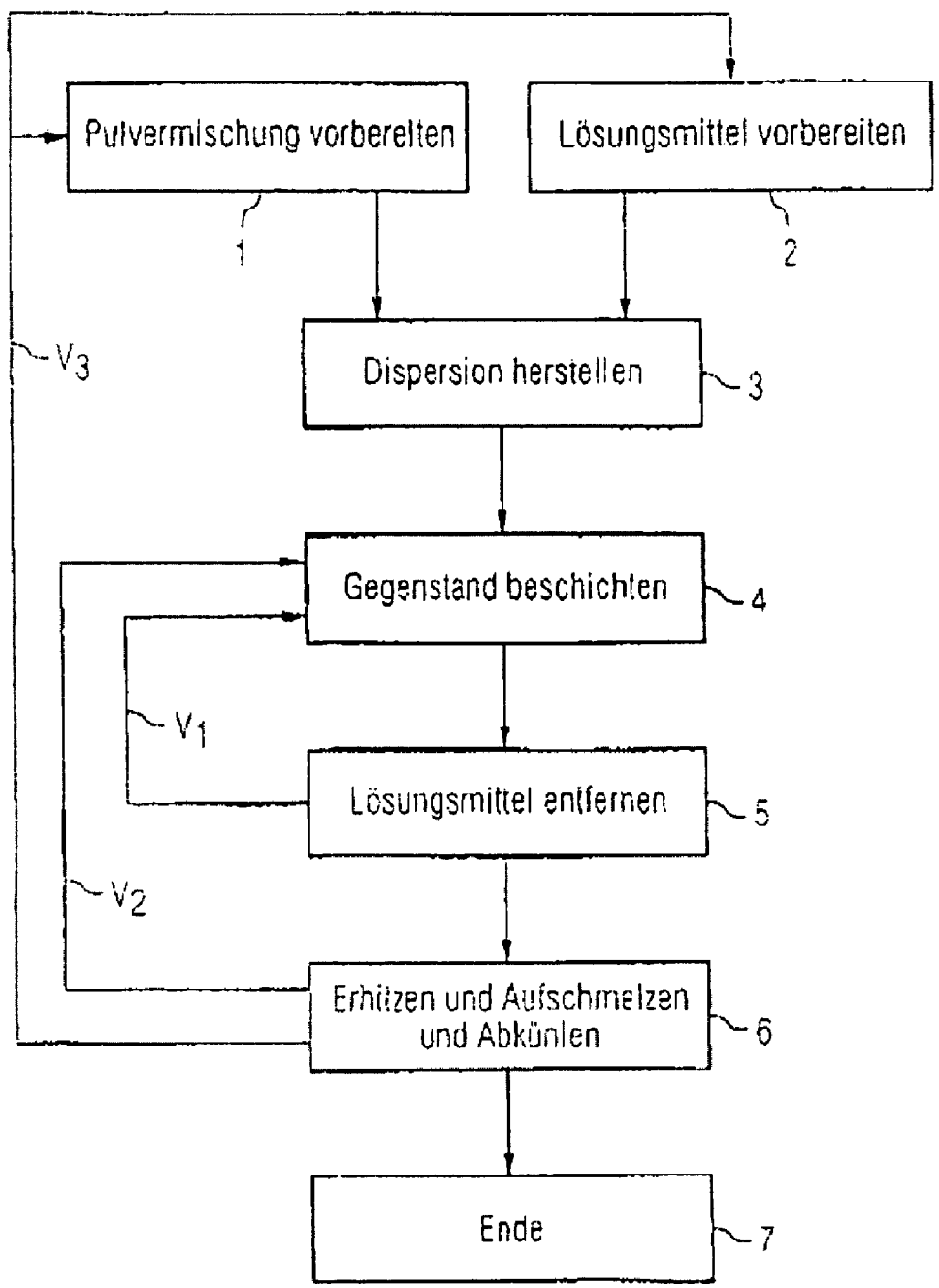
FIG. 4 shows a flow diagram for a coating by dispersion processes.

The process sequence described above is illustrated in a clearer form in FIG. 4 in a flow diagram. In step 1, the process comprises the manufacture and preparation of the powder mixture. For this purpose, the ingredients, selected from a thermoplastic polymer, a filler and a dry lubricant, may be either brought to a suitable particle size, for example, by grinding, and/or they are brought, by subsequent sorting, to a grain size that conforms to the desired grain size distribution, which is as narrow as possible.

In step 2, in parallel to this, one prepares the solvent, which may be innocuous from environmental and heath-related viewpoints and may be water-based e.g., prepared from a mixture comprising alcohol and water, e.g. isopropanol and water. An advantageous solvent composition contains, for instance, 25-75 wt % isopropanol in water. A solvent with approximately 75 wt % isopropanol in water is especially preferred.

In step 3, the dispersion may be manufactured by mixing the prepared powder mixture with the solvent, maintaining a solids content of 30-50 wt %. In order to improve the stability of the dispersion, conventional dispersion aids can be added in small proportions.

In step 4, the surface of the object is coated, e.g. by spraying, immersion, brushing, printing or by spin-coating. As homogeneous as possible a thickness of the dispersion layer is sought and surface regions that are not to be coated are left alone.

In step 5, the solvent is removed by evaporation, which can optionally be assisted by negative pressure.

In the subsequent step 6, the object with the applied and dried dispersion layer may be converted into a homogeneous coating by heating and melting of the thermoplastics, and then the object may be cooled down once again.

Followed by step 6, a finished coating can be obtained at point 7.

In one embodiment of the process, it is possible to carry out steps 4 through 7 again directly after step 7.

In another embodiment V2 follows on from step 6, after the melting of the first dispersion layer, a new dispersion layer may be applied (step 4) and appropriately compacted (steps 5 through 7).

V3 In one embodiment of the process, a second sublayer, which is different from the first coating, may be applied following the manufacture of the first coating. In order to do this, a further dispersion may be manufactured in accordance with process steps 1-3, and the object may be coated therewith in accordance with steps 4-6. Here also, the process V1 V2 can be modified by repeating individual process steps or individual process step sequences in order to achieve the desired layer thickness.

A Homogeneous coating can be obtained, in particular when finely divided particles are used for the dispersion, this especially homogenous coating making multiple coating advantageous or essential because of the small particle diameters.

A wear test was carried out with a coating produced and a comparison was made with a conventional coating that comprises a sintered metal. Whereas wear amounting to a layer thickness reduction of 15 μm arises for a given load and initial layer thickness with the conventional coating after a given time, reduced wear in the form of a layer thickness reduction of only 2 μm is observed with a coating in this application for the same load and the same initial layer thickness. This shows the superiority of the new coating and its improved wear resistance.

Possible variations result, in particular, from a suitable selection of fillers and, optionally, from mixtures of different fillers. The quantity relationships that are used for the components of the coating may be selected in accordance with the desired load on the coating. The same applies to the layer thicknesses, which are likewise not limited to the examples that have been given. The coating may be advantageously applied to metallic surfaces, but the coating can also take place on other surfaces, such as a ceramic material, glass or suitable synthetic materials.

This application may be advantageously used for an object whose bearing location is constructed in the form of a sliding bearing. Such a sliding bearing can be suitable for the accommodation of a rotating shaft or to facilitate, e.g., as a result of reduced friction with improved wear characteristics, the translational movements of a device that comprises an object and counter-piece in operation in accordance with regular requirements. Coatings can also reduce rolling friction, and are therefore utilized in roller bearings. Naturally, it is also possible to utilize these coatings in a wide variety of bearings, even if the bearing location may be not subject to friction via the counter-piece. The coating can thus be employed for static and dynamic bearings and machine parts and, in this way, it can also perform simple sealing functions, wherein it always has only low wear. Fields of application are mechanical and electromechanical devices and machines, as well as combustion engines. Concrete, but not exhaustive, examples of additional applications are therefore connecting rod bearings, pistons, piston rods, piston rings and piston seals in combustion engines, pumps and compressors, as well as dynamic seals and wheel suspension units.

In general terms, this application may be usable for bearing surfaces that are located within the flow of power, e.g. in cylinder head seals, and especially for the stoppers that have to accommodate the greater part of the compressive pressure and hence large forces and are subjected to large frictional forces as well.

The invention claimed is:

1. An object with a bearing location where the object comes into contact with a counter-piece, the bearing location having a coating, the coating comprising:
   about 90-100 weight percent thermoplastic polymer selected from the family of the polyaryletherketones; and
   about 0-10 weight percent finely divided solid fillers and finely divided dry lubricants; wherein the coating has a thickness of between about 5-50 μm and the coating forms an outermost surface of the object at the bearing location where the object comes into contact with the counter-piece;
   wherein the thickness of the coating is between about 5-30 μm.

2. The object of claim 1, wherein the coating is free from fluorine-containing polymers.

3. The object of claim 1, wherein the coating comprises at most about 5% by weight of the finely divided solid fillers.

4. The object of claim 1, wherein the solid fillers are selected from the group consisting of nano ceramic particles, metallic particles, silica, quartz and diamond.

5. The object of claim 4, wherein the metallic particles are selected from the group consisting of aluminum, bronze, copper, tin, chromium, nickel, antimony, titanium, zirconium, manganese, cobalt, zinc and the oxides thereof, and iron oxide.

6. The object of claim 1, wherein the dry lubricant comprises at most 2 percent by weight graphite or molybdenum sulfide.

7. The object of claim 1, wherein the coating comprises a multilayer structure.

8. The object of claim 7, wherein the polyaryletherketones comprise PEK, PEKKEK, PEEK, LCP, PPS, or mixtures of PEK and PEEK.

9. The object of claim 1, wherein a maximum particle size of the fillers is at least an order of magnitude less than the thickness of the coating.

10. The object of claim 1, wherein the polyaryletherketones comprise one or more of PEEK, PEK, LCP, PPS, or mixtures of PEEK and PEK.

11. The object of claim 1, wherein the coating further comprises an adhesion promoting layer, the adhesion promotion layer comprising at most about 90 percent by weight of finely divided metallic particles in addition to a thermoplastic polymer.

12. The object of claim 1, wherein the thickness of the coating is between about 10 μm and 20 μm.

13. An object with a bearing location where the object comes into contact with a counter-piece, the bearing location having a coating, the coating comprising:
   about 90-100 weight percent thermoplastic polymer selected from the family of the polyaryletherketones; and
   about 0-10 weight percent finely divided solid fillers and finely divided dry lubricants; wherein the coating has a thickness of between about 5-50 μm and the coating forms an outermost surface of the object at the bearing location where the object comes into contact with the counter-piece;
   wherein the coating comprises at least 95% by weight of the thermoplastic polymer.

14. The object of claim 13, wherein the coating is free from fluorine-containing polymers.

15. The object of claim 13, wherein the coating comprises at most about 5% by weight of the finely divided solid fillers.

16. The object of claim 13, wherein the solid fillers are selected from the group consisting of nano ceramic particles, metallic particles, silica, quartz and diamond.

17. The object of claim 16, wherein the metallic particles are selected from the group consisting of aluminum, bronze, copper, tin, chromium, nickel, antimony, titanium, zirconium, manganese, cobalt, zinc and the oxides thereof, and iron oxide.

18. The object of claim 13, wherein the dry lubricant comprises at most 2 percent by weight graphite or molybdenum sulfide.

19. The object of claim 13, wherein the coating comprises a multilayer structure.

20. The object of claim 19, wherein the polyaryletherketones comprise PEK, PEKKEK, PEEK, LCP, PPS, or mixtures of PEK and PEEK.

21. The object of claim 13, wherein a maximum particle size of the fillers is at least an order of magnitude less than the thickness of the coating.

22. The object of claim 13, wherein the polyaryletherketones comprise one or more of PEEK, PEK, LCP, PPS, or mixtures of PEEK and PEK.

23. The object of claim 13, wherein the coating further comprises an adhesion promoting layer, the adhesion promotion layer comprising at most about 90 percent by weight of finely divided metallic particles in addition to a thermoplastic polymer.

24. A method for the application of a coating to an object using a dispersion, the dispersion comprising:
- coating components in finely divided dispersed form in a solvent, the components including at least one finely divided thermoplastic polymer is selected from the family of the polyaryletherketones;
- applying the dispersion to the object; and
- bringing the object to a temperature above a melting point of the thermoplastic polymer to obtain a homogeneous compact coating comprising about 90-100 weight percent thermoplastic polymer selected from a family of the polyaryletherketones and about 0-10 weight percent finely divided solid fillers and finely divided dry lubricants with a layer thickness of between about 5-50 µm, the coating forming an outermost surface of the object at a bearing location where the object comes into contact with a counter-piece;
- wherein the object is partially coated.

25. The method of claim 24, wherein the solvent for dispersion comprises 25-75 percent by weight of isopropanol and water,
- wherein the dispersion further comprises polymer, fillers, and about 20-50 percent by weight of finely divided solids.

26. An object with a bearing location where the object comes into contact with a counter-piece, the bearing location having a coating, the coating comprising:
- about 90-100 weight percent thermoplastic polymer selected from the family of the polyaryletherketones; and
- about 0-10 weight percent finely divided solid fillers and finely divided dry lubricants; wherein the coating has a thickness of between about 5-50 µm and the coating forms an outermost surface of the object at the bearing location where the object comes into contact with the counter-piece;
- wherein the object comprises a sliding bearing.

* * * * *